Feb. 18, 1958 R. H. GILL 2,823,724
TUBELESS TIRE VALVE AND RIM ASSEMBLY
Filed Sept. 23, 1955 2 Sheets-Sheet 1
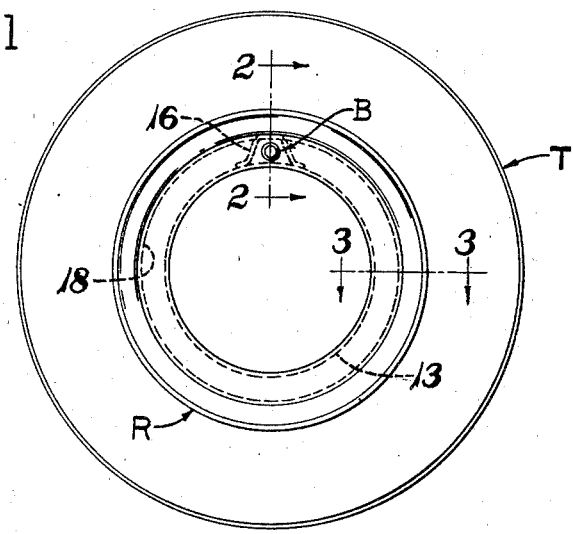
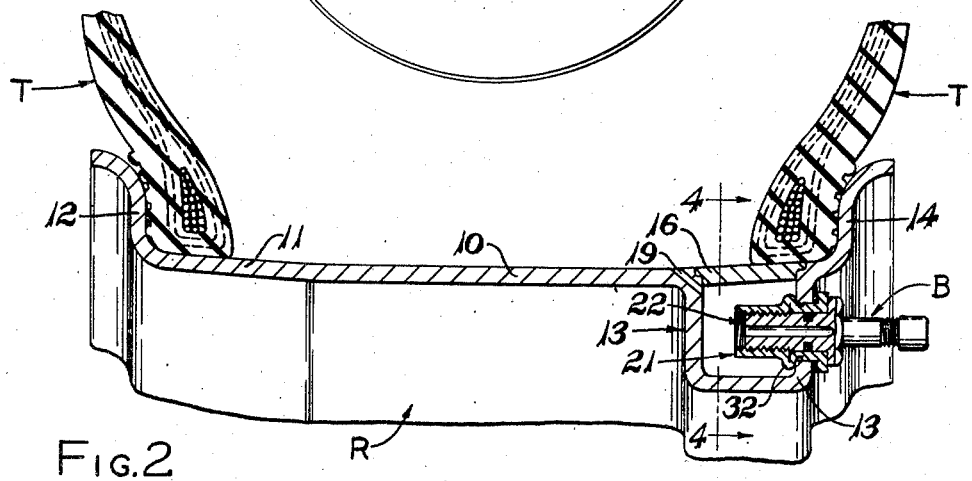
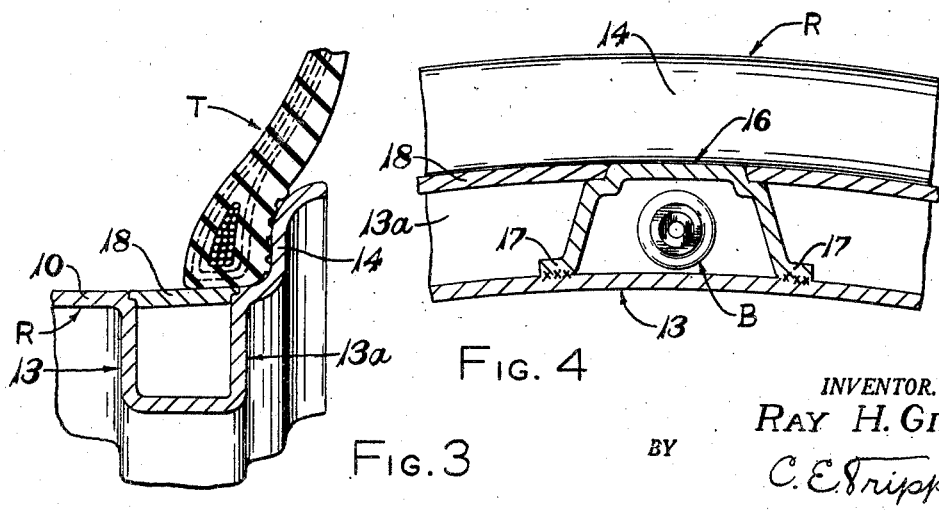
INVENTOR.
RAY H. GILL
BY C. E. Tripp
ATTY.

Feb. 18, 1958 R. H. GILL 2,823,724
TUBELESS TIRE VALVE AND RIM ASSEMBLY
Filed Sept. 23, 1955 2 Sheets-Sheet 2

INVENTOR.
RAY H. GILL
BY C. E. Tripp
ATTY.

United States Patent Office 2,823,724
Patented Feb. 18, 1958

2,823,724

TUBELESS TIRE VALVE AND RIM ASSEMBLY

Ray H. Gill, Akron, Ohio, assignor to The B. F. Goodrich Company, New York, N. Y., a corporation of New York Application September 23, 1955, Serial No. 536,098

1 Claim. (Cl. 152—427)

This invention relates to tubeless tire, rim and valve assemblies. In such assemblies the valve body and valve core or closure member assembly required to inflate the tire and force its beads into sealing engagement with the rim flanges is mounted in the rim. Since rims are formed of carbon steel rolled into their final section and shape, it is not desirable or even feasible to form the valve body integrally with the rim. It is important from a manufacturing cost standpoint that the rim be designed to have a minimum number of interruptions of its surfaces of revolution whereby operations required after the rim has been rolled, may be reduced to a minimum or at least made very simple. It has also been found desirable in many cases and mandatory in others that the valve body be mounted and attached to the rim from the outside of the rim, that is, from the side of the rim wall opposite that forming, in conjunction with the tire, the air chamber. It is possible to provide a relatively soft rubber valve body that may be "popped" into an aperture in the rim wall from the outside, but such valve body can also be popped out in service. There is a need for a valve body of more rigid construction such as a metal body which can be inserted and clamped in an aperture in the rim wall from the outside, and without need for access to the opposite or inside wall of the rim. Such a valve body and rim assembly is a feature of this invention wherein a headed shank or rivet sleeve member is inserted through an aperture in the rim wall from the outside and then by means of a tool is upset against the inside of the rim wall, the construction being such that an air tight seal is formed at the joint. A separate valve stem member is then threaded into the shank, sealing means being provided between the stem and the rivet sleeve for maintaining an air tight joint. The stem may mount any conventional or suitable valve core for inflation of the tire. The construction of this invention has the further property that should projection parts of the valve stem be damaged or broken off, the stem can be replaced, the shank or rivet being permanent and not exposed to such damage. Also various sizes and designs of valve stems for receiving various valve cores may be fitted as desired to the semi-permanent rivet or shank member mounted in the rim.

The manner in which these features may be obtained by one skilled in the art will be apparent from the following detailed description of a preferred embodiment of the invention.

In the drawings,

Fig. 1 is a plan view of an assembly embodying a rim construction wherein the inside of the valve is inaccessible.

Fig. 2 is a section taken on 2—2 of Fig. 1.

Fig. 3 is a section taken on 3—3 of Fig. 1.

Fig. 4 is a section taken on 4—4 of Fig. 2.

Figure 7:
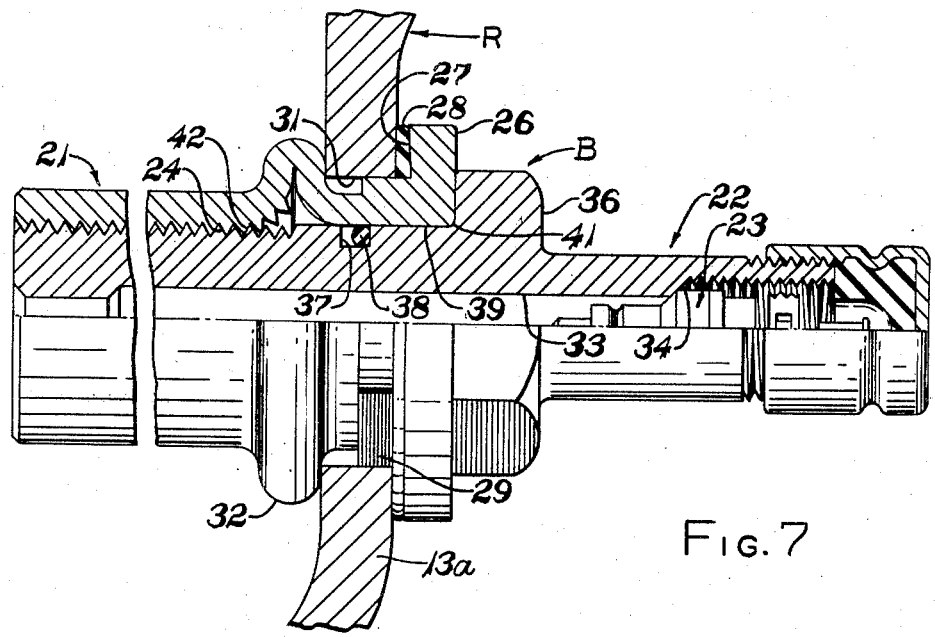
Fig. 7 is an enlarged section through the valve assembly as mounted in the rim.

The rim shown for use in the combination is one wherein the drop center or well construction is employed giving a one piece rim and yet permitting the inextensible tire beads to be mounted over the rim side flanges.

The drop center well in the rim shown is offset to the axially outer side of the rim to provide increased clearance for a wide, large diameter brake drum and such construction requires that the bead seat or generally axially disposed load supporting flange on the axially outer side of the rim be disposed under or within the tire bead. Such a construction is described and claimed in the copending application of W. F. Billingsley, Serial No. 524,731, filed July 27, 1955, and assigned to The B. F. Goodrich Company, and will only be described briefly here. Referring to Figures 2–4, the rim R has a base section 10 merging with a tapered inner bead seat 11 from which extends a tire retaining side flange 12. The well 13, which in this case is axially outwardly disposed, receives one tire bead during mounting, and includes an outer wall 13a extending radially and merging with the outer tire retaining side flange 14. In order to protect the inner projecting part of the valve from damage during mounting, a shroud or sheet metal case 16 of U-shaped section as seen in Fig. 4 is mounted in the well surrounding the valve and welded to the base of the well as by means of flanged feet 17. As explained in detail in the aforesaid co-pending application of Billingsley, the bead seat ring 18, forming almost a complete circle, seats at its opposite ends on the shroud 16, it being understood that the ring 18 is fitted after the inner bead of tire T has first been forced over the rim flange and slid into place, using the well 13 in the usual manner, and after the outer bead of the tire has likewise been forced over the outer rim flange and moved axially inwardly to clear the well. Once the bead seat ring 18 is snapped in place, and as seen in Fig. 3, it seats all the way around its length, the outer bead of the tire is manipulated (as by using a restrictor band) causing the beads to approach their final position and causing the outer bead to clear the inflation apertures 19, seen in Fig. 2, to conduct air from the chamber formed by the valve shroud and well into the interior of the tire and rim assembly.

Figure 5:
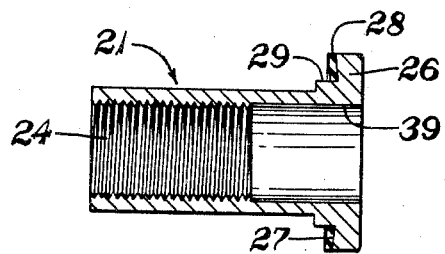
Fig. 5 shows the rivet sleeve or shank member before it is upset into the rim aperture.
Figure 6:
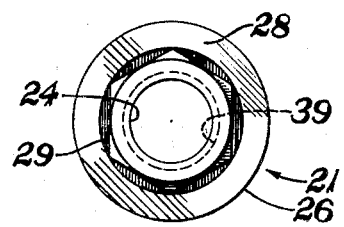
Fig. 6 is an end view of the rivet sleeve.

The valve assembly B includes a rivet sleeve or shank member 21 a separate valve stem member 22, and a valve core member 23, the construction of the latter forming no part of the invention with that shown being a well known commercial design. Before assembly, as seen in Fig. 5, the rivet sleeve has a straight metal shank portion internally threaded as at 24 and headed as at 26. The inner face of the head may be reversely bevelled or undercut as at 27 to receive a sealing gasket formed of suitably reinforced rubber, Neoprene or the like having adequate compression strength, heat resistance and air diffusion resistant properties, the exact compound of this gasket forming no part of the invention and the selection of a suitable compound being within the skill of the art. Where the head merges with the shank, a hex is formed as at 29 to give a non-rotatable fit with a hex hole 31 punched in the wall 13a of the rim well. Of course, other polygonal or non-circular shapes may be used.

After the gasket 28 is slipped in place, the rivet sleeve 21 is positioned in the rim aperture and a tool is applied to attach the sleeve to the rim. This tool has a threaded shank which fits in threads 24 of the rivet sleeve and a collar that presses against the head 26 of the sleeve. The tool is operated to pull the shank axially outwardly while the collar presses against the head 26. A suitable tool for the purpose is described in Patent No. 2,069,907 to Harry E. Waner, dated February 9, 1937. This action causes the shank to expand into a U-shaped section annular bulge 32 as seen in Fig. 7 and the spring-back of the metal of the bulge coupled with the compression of the gasket 28 in its undercut chamber 27 in the head of the rivet results in a tight, resiliently pressing mechanical fit which is shakeproof and leakproof. It will be noted that sleeve 21 is in effect, a permanent part of the rim and the only part that projects from the rim on the outside is the thin flange-like head 26.

Figure 8:
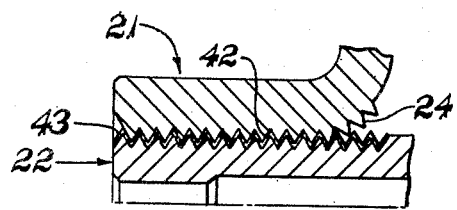
Fig. 8 shows a modified form of sealing means between the valve stem and rivet sleeve.

The separately attachable and interchangeable stem 22 has an axial bore 33 for conducting air into the assembly and in the form shown has a bevelled seat 34 for sealing with the gasket on the valve core 23 mounted in the stem by means of internal threads in the usual manner. The valve stem is flanged as at 36 to provide tight engagement with the head 26 of the rivet member, the flange 36 being hexagonal or otherwise formed to receive a wrench or the like. An air seal between the stem 22 and the rivet member 21 is required so that the stem 22 is grooved as at 37 to receive a rubber O-ring 38 that cooperates with the walls of the groove and the smooth walled bore 39 in the rivet member to provide a self adjusting air seal. The rivet member and stem may each be formed with tightly fitting radius portions as at 41 to provide a seal at this point. The stem and sleeve members are securely joined by applying a tool to the hexagonal flange 36 of the stem, tightening threads 42 against the threads 24 in the rivet shank. It will be noticed that this tightening action not only maintains a gripping joint between the rivet shank and the rim wall, but may actually augment or improve this action by further springing or closing the bulge 32. In addition to or in place of the seals effected by the O-ring or the radius corners 41, as seen in Fig. 8 shank threads 24 or stem threads 42, or both, may be precoated with a thin filament 43 of tough yieldable material such as nylon, so that when the threads are forced into final engagement, an effective seal is provided at the threads.

Thus it can be seen that a valve rim and tubeless tire assembly is provided wherein a rivet or metal valve body is readily mounted in an aperture in a rim wall from the outside. The projecting valve stem may be of metal and if so, if it is broken it can be readliy replaced. Also valve stems having different arrangements for receiving the valve core or closure member for different sizes of inflation apertures can be selectively fitted with the semi-permanent rivet shank. Finally, the assembly of the valve stem with the rivet shank members, causes the joint between the latter and the rim wall to firmly and resiliently press against the rim giving a shakeproof, leakproof joint.

I contemplate that in broader aspects of the invention due to its ease of mounting and the permanency of the resulting assembly, the valve portion of the invention might be employed on rims of suitable construction even where there might be access to the inside or inflation side of the valve.

Although I prefer that the rivet shank 21 be made of A. I. S. I. C–1108 free machining, cold drawn low carbon steel plated as with cadmium, it can, where less strength is required, be formed of drawn brass or aluminum alloy, or in some cases of a stiff thermoplastic material that has metal-like characteristics as to its resilience and resistance to deformation such as nylon stock. The stem 22 is preferably formed of brass, anodized aluminum alloy, or other corrosion resistant stock, or if plated, of easily machined stock such as the aforesaid low carbon screw stock steel.

Having completed a detailed description of preferred embodiment of the invention, I claim:

In combination, a side flanged tubeless tire rim having a drop center well adjacent the axially outer side flange, a U-shaped shroud occupying part of said well forming a chamber for reception of a valve assembly, a circular band resting at its ends on said shroud and covering the balance of the well, an aperture in the outside wall of said well at said shroud, and a tire valve assembly mounted in the aperture portion from the outside of the wall, said valve assembly comprising a shank of material having metal-like deformation characteristics, said shank having a through bore internally threaded at one end, said shank being headed at the other end, said shank being fixed in said rim wall aperture with the head at the outside wall surface and a radially bulged rib formed in the shank resiliently pressing against the opposite rim wall surface, an axially bored valve stem threaded into said internally threaded shank portion and extending outwardly past the head of said shank, and means for sealing said shank against the rim wall portion and the stem against the shank against air leakage, and air passage means extending from said chamber at a zone axially inward of the axially outer side flange.

References Cited in the file of this patent

UNITED STATES PATENTS

| | | |
|---|---|---|
| 2,392,133 | Eklund | Jan. 1, 1946 |
| 2,690,279 | Ward | Sept. 28, 1954 |

FOREIGN PATENTS

| | | |
|---|---|---|
| 1,097,514 | France | Feb. 16, 1955 |